United States Patent
Schumacher et al.

(10) Patent No.: US 8,127,552 B2
(45) Date of Patent: Mar. 6, 2012

(54) TRANSITION SCROLLS FOR USE IN TURBINE ENGINE ASSEMBLIES

(75) Inventors: Jurgen C. Schumacher, Phoenix, AZ (US); Ian L. Critchley, Phoenix, AZ (US); David G. Walhood, Scottsdale, AZ (US); Stony W. Kujala, Tempe, AZ (US); Gregory O. Woodcock, Mesa, AZ (US)

(73) Assignee: Honeywell International, Inc., Morristown, NJ (US)

( * ) Notice: Subject to any disclaimer, the term of this patent is extended or adjusted under 35 U.S.C. 154(b) by 1021 days.

(21) Appl. No.: 12/016,360

(22) Filed: Jan. 18, 2008

(65) Prior Publication Data

US 2009/0199568 A1 Aug. 13, 2009

(51) Int. Cl.
*F02C 1/00* (2006.01)
*F02G 3/00* (2006.01)

(52) U.S. Cl. .............. 60/752; 60/39.37; 60/754

(58) Field of Classification Search ............ 60/752–760, 60/804, 39.37, 805, 722
See application file for complete search history.

(56) References Cited

U.S. PATENT DOCUMENTS

| | | | | |
|---|---|---|---|---|
| 4,129,985 A | * | 12/1978 | Kajita et al. | 60/39.37 |
| 4,339,925 A | * | 7/1982 | Eggmann et al. | 60/757 |
| 4,573,315 A | * | 3/1986 | Stroem | 60/39.37 |
| 4,719,748 A | * | 1/1988 | Davis et al. | 60/39.37 |
| 4,872,312 A | * | 10/1989 | Iizuka et al. | 60/760 |
| 6,305,172 B1 | | 10/2001 | Kim | |
| 6,568,187 B1 | | 5/2003 | Jorgensen et al. | |
| 6,644,032 B1 | | 11/2003 | Jorgensen et al. | |
| 6,912,782 B2 | | 7/2005 | Nguyen et al. | |
| 7,000,400 B2 | | 2/2006 | Schumacher et al. | |
| 7,007,475 B2 | | 3/2006 | Nguyen et al. | |
| 7,007,480 B2 | | 3/2006 | Nguyen et al. | |
| 7,093,448 B2 | | 8/2006 | Nguyen et al. | |
| 7,251,942 B2 | * | 8/2007 | Dittmar et al. | 60/788 |
| 7,269,958 B2 | | 9/2007 | Sanstny et al. | |
| 7,310,938 B2 | * | 12/2007 | Marcum et al. | 60/39.37 |
| 2005/0241316 A1 | * | 11/2005 | Nguyen et al. | 60/772 |
| 2006/0130484 A1 | | 6/2006 | Marcum et al. | |
| 2007/0017225 A1 | | 1/2007 | Bancalari et al. | |
| 2009/0188256 A1 | * | 7/2009 | Woodcock et al. | 60/754 |

* cited by examiner

*Primary Examiner* — William Rodriguez
(74) *Attorney, Agent, or Firm* — Ingrassia Fisher & Lorenz, P.C.

(57) ABSTRACT

An engine assembly includes a combustor having a combustion chamber in which an air and fuel mixture is combusted to produce combustion gases. The engine assembly further includes a transition scroll coupled to the combustor for receiving the combustion gases. The transition scroll includes an interior surface, an exterior surface, and effusion cooling holes for providing cooling air to the interior surface. The engine assembly further includes a turbine coupled to the transition scroll for receiving and extracting energy from the combustion gases.

18 Claims, 3 Drawing Sheets

TRANSITION SCROLLS FOR USE IN TURBINE ENGINE ASSEMBLIES

STATEMENT REGARDING FEDERALLY SPONSORED RESEARCH OR DEVELOPMENT

This invention was made with Government support under contract number N00019-02-C-3002 awarded by the JSF-PTMS program of the US Government. The Government has certain rights in this invention.

TECHNICAL FIELD

The present invention generally relates to turbine engine assemblies and more specifically, to transition scrolls for use in turbine engines assemblies.

BACKGROUND

Gas turbine engines are used to power aircraft or various other types of vehicles and systems. Engines typically include a compressor that receives and compresses an incoming gas such as air. A combustor receives the compressed gas, mixes it with fuel, and ignites the mixture to produce a high-pressure, high-velocity exhaust gas. A transition scroll receives, redirects, and provides the exhaust gas to a turbine that extracts energy for the engine. The transition scroll is a hollow, generally coiled component that receives a tangential flow of the hot combustion gases into its interior and exhausts these gases through an annular outlet into the turbine.

The hot combustion gases create a temperature environment that may limit the useful operating time, and ultimately, the component life of the engine assembly. Particularly, the transition scroll can be sensitive to variations and extremes in temperature resulting from the combustor exhaust gases. This consideration is complicated by the helical, asymmetrical nature of the transition scroll and the non-uniform temperatures of the exhaust gases exiting from the combustor. Conventional systems and methods for cooling the transition scroll, such as louvers and impingement cooling, have met with mixed success at best.

Accordingly, it is desirable to provide improved systems and methods for cooling the transition scroll. Furthermore, other desirable features and characteristics of the present invention will become apparent from the subsequent detailed description of the invention and the appended claims, taken in conjunction with the accompanying drawings and this background of the invention.

BRIEF SUMMARY

In one exemplary embodiment, an engine assembly includes a combustor having a combustion chamber in which an air and fuel mixture is combusted to produce combustion gases. The engine assembly further includes a transition scroll coupled to the combustor for receiving the combustion gases. The transition scroll includes an interior surface, an exterior surface, and effusion cooling holes for providing cooling air to the interior surface. The engine assembly further includes a turbine coupled to the transition scroll for receiving and extracting energy from the combustion gases.

In another exemplary embodiment, a transition scroll is configured to receive combustion gases from a combustor and provide the combustion gases to a turbine. The transition scroll includes a body configured to extend between the combustor and the turbine scroll. The body has a hot surface and a cold surface during operation. The transition scroll includes effusion cooling holes formed in the body for supplying cooling air to the hot surface.

In accordance with yet another exemplary embodiment, an engine assembly includes a can combustor having a combustion chamber in which an air and fuel mixture is combusted to produce combustion gases. The engine assembly further includes a turbine for receiving and extracting energy from the combustion gases. The engine assembly further includes a transition scroll coupling the can combustor to the turbine. The transition scroll is helical with an inlet coupled to the can combustor and a B-width outlet coupled to the turbine. The transition scroll has a hot surface, a cold surface, and effusion cooling holes for providing a layer of cooling air to the hot side. The transition scroll further includes an inner portion and an outer portion, and the effusion cooling holes include a first group with a first density on the outer portion and a second group with a second density on the inner portion. The first density is greater than the second density.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the application and uses of exemplary embodiments. Furthermore, there is no intention to be bound by any theory presented in the preceding background or the following detailed description.

Broadly, the exemplary embodiments discussed herein provide cooling schemes for transition scrolls in engine assemblies. More particularly, the transition scrolls are provided with effusion cooling holes for supplying a film of cooling air to an inner surface. The effusion cooling holes can be positioned on and adjacent to an inlet of the transition scroll that receives the exhaust gases from the combustor. Moreover, the effusion cooling holes can be used to cool the relatively large surface area of the turbine scroll in an efficient manner. Embodiments discussed herein may find beneficial use in many industries and applications, including aerospace, automotive, and electricity generation, but particularly in high performance aircraft.

Figure 1:
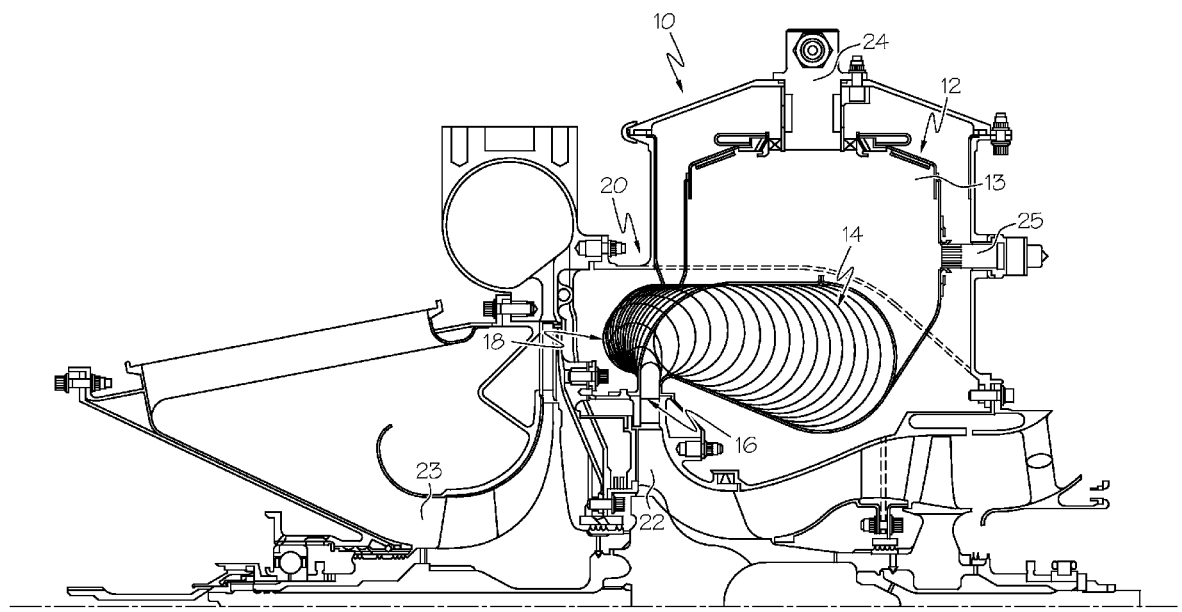
FIG. 1 is a cross-sectional view of a turbine engine assembly in accordance with an exemplary embodiment.

FIG. 1 is a cross-sectional view of an engine assembly 10 in accordance with an exemplary embodiment. The engine assembly 10 includes a combustor 12, a turbine 22, and a transition scroll 14 that couples the combustor 12 to the turbine 22. The combustor 12 forms a combustion chamber 13 in which compressed air from a compressor 23 and fuel from a fuel injector 24 are received and mixed. The resulting fuel-air mixture is ignited by an igniter 25 to produce high energy combustion gases. As will be discussed in further detail below, the combustion gases exit the combustor 12 into the transition scroll 14. The transition scroll 14 then provides the combustion gases to the turbine 22 for energy extraction.

The transition scroll 14 particularly serves to redirect the combustion gases into an appropriate condition for receipt by the turbine 22. A combustion exhaust product discharge area, also known as a B-width 16, couples the transition scroll 14 to the turbine 22. Accordingly, the transition scroll 14 distributes the combustor gases from a simple cylindrical flow channel to a radially inward flow channel between parallel plates, or in an alternate embodiment, an annular axial flow channel.

In many engines, the transition scroll 14 is shaped to be housed within a combustor housing 20 with the combustor 12. As such, in addition to being configured to condition the combusted exhaust gases for the turbine 22, the transition scroll 14 can be designed to minimize the space taken up within the limited combustor housing 20 to enable the volume of the combustor 12 to be optimized. As discussed below in greater detail, the transition scroll 14 may have a helical, asymmetrical shape with irregular cross-sections based on functional as well as size constraints.

In one embodiment, the helical design of transition scroll 14 forms an axial shift region 18, which is a region of transition scroll 14 that is shifted along the axis about which the scroll spirals. The axial shift region 18 causes the cross-sectional area centroid of a portion of transition scroll 14 to pass beyond B-width 16. The axial shift region 18 may be useful to provide for additional scroll volume and to optimize combustor volume.

Figure 2:
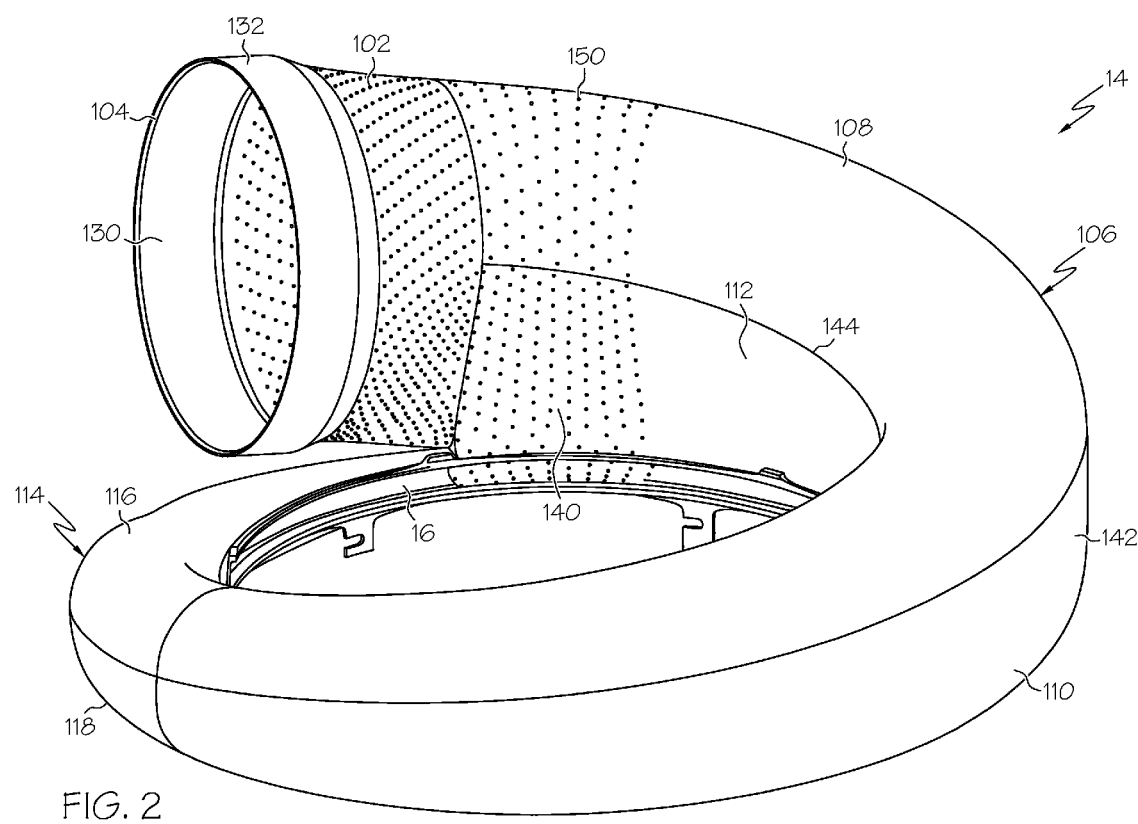
FIG. 2 is an isometric view from a first side of an exemplary transition scroll of the turbine engine assembly of FIG. 1.
Figure 3:
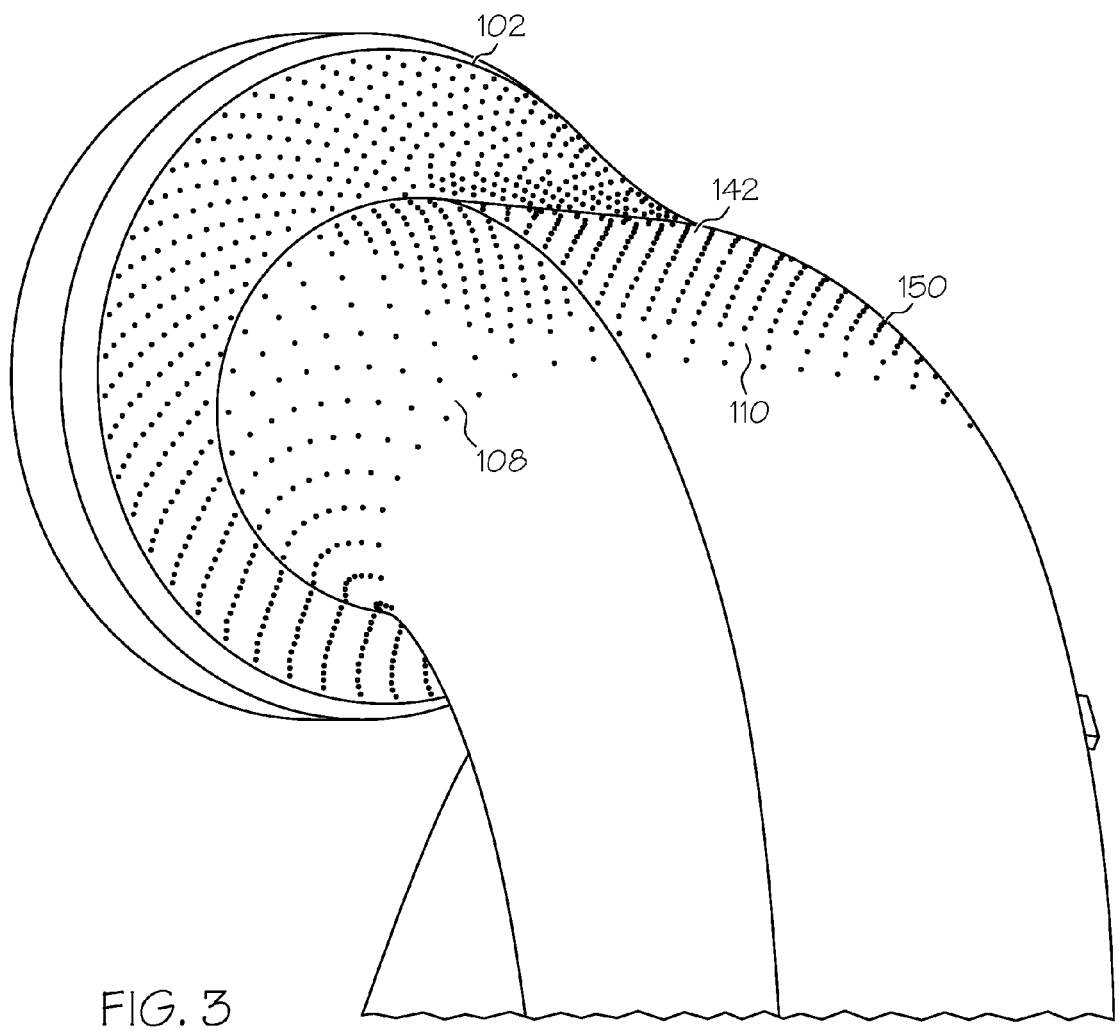
FIG. 3 is a more detailed view from a second side of the transition scroll of FIG. 1.

FIG. 2 is an isometric view of the transition scroll 14 of the engine assembly 10 of FIG. 1, and FIG. 3 is a partial isometric view of the transition scroll 14 from a different perspective. As discussed above, the transition scroll 14 is configured to receive combustion exhaust gases, and transition the gases to be received by the turbine 22 (FIG. 1). The transition scroll 14 has an inlet 102 with an inlet flange 104 that is configured to be coupled to the combustor 12 (FIG. 1). Each component of the transition scroll 14 can be considered to have a hot side (e.g., hot side 130 of the inlet 102) that contacts the exhaust gas and a cold side (e.g., cold side 132 of the inlet 102) opposite the hot side. In one embodiment, a thermal barrier coating can be provided on the hot side of one or more components of the transition scroll 14. Generally, the inlet 102 is bell-shaped with a gradual reduction in cross-sectional area. The inlet 102 transitions into a main body 106 that continues the gradual reduction in cross-sectional area. In various embodiments, the main body 106 is manufactured from a top main body wall 108, a bottom main body wall 110, and an inner main body wall 112. The main body 106 is coupled to an end portion 114, which may include a top end portion wall 116 and a bottom end portion wall 118. The main body 106 and end portion 114 each at least partially define the B-width 16 that serves as the outlet for the transition scroll 14.

Each of the inlet 102, the main body 106, and the end portion 114 typically have non-circular and/or irregular cross-sectional shapes, although circular or other regular shapes can be provided. Moreover due to its helical geometry, the transition scroll 14 can be considered to have an inner section 140 and an outer section 142.

As discussed above, in many applications, cooling of the transition scroll 14 is beneficial to prevent issues resulting from the high temperatures of the exhaust gas of the combustor 12 (FIG. 1). The combustion gases directly impinge some of the hot or inner surfaces of the transition scroll 14, and are redirected into the turbine 22 (FIG. 1). The irregular cross-sections and helical shape of the transition scroll 14 can additionally complicate some cooling schemes, particularly attempts at louver and impingement cooling techniques.

In one exemplary embodiment, effusion cooling holes 150 are provided in the transition scroll 14. The effusion cooling holes 150 are generally relatively small, closely spaced holes that permit compressed air from the cold side to pass through the respective wall of the transition scroll 14 for supplying a layer of cooling air to the hot side. In particular, the cooling air serves to buffer the hot side from the exhaust gases, as well as to convectively cool the respective wall of the transition scroll 14 as the air passes through, while having a minimized impact on the primary flow patterns.

Unlike the prior art cooling systems and methods that require heat shields, impingement, and/or louvers, the effusion cooling holes 150 may simplify cooling in most embodiments in that no additional components need be attached to the transition scroll 14. Such components may be provided in addition, however, in embodiments where more cooling is desired. The durability of the transition scroll 14 may be extended by a reduction in temperature gradients along the transition scroll 14, and additionally, manufacturing costs may be reduced.

As a general matter, the effusion cooling holes 150 can be patterned to further improve cooling. The effusion cooling holes 150 are typically concentrated immediately downstream of the combustor exit where the combustion gases are hottest. Moreover, the density of the effusion cooling holes 150 may vary with application and may depend on factors, including the dimensions of the transition scroll 14, the material of manufacture of the transition scroll 14, the velocity of the cooling flow, and the local temperature and velocity of the combustion gases. For some applications, the effusion cooling holes 150 may be uniformly spaced. Alternatively, the effusion cooling holes 150 may be unevenly spaced to provide more cooling flow to potential "hot spots" resulting from the geometry of the transition scroll 14 and temperature characteristics of the combustion gases.

In the depicted embodiment, the inlet 102 has generally uniform effusion cooling holes 150 with a density of, for example, 20-30 holes per square inch. At least a portion of the top main body wall 108 has uniform effusion cooling holes 150 with a density of, for example, 10-20 holes per square inch. At least a portion of the inner main body wall 112 has uniform effusion cooling holes 150 with a density of, for example, 20-30 holes per square inch; and at least a portion of the bottom main body wall 110 has uniform effusion cooling holes 150 with a density of, for example, 30-50 holes per square inch. In various embodiments, the effusion cooling holes 150 on each of the components can be increased or decreased as desired. For example, the effusion cooling holes can be 5 holes per square inch, or lower, or 100 holes per square inch, or higher. Generally, the density of the effusion cooling holes is optimized to produce a constant surface temperature on the inlet 102 and body walls 108, 110, and 112.

In one embodiment, the density of the effusion cooling holes 150 of the inlet 102 is greater than the density of the effusion cooling holes 150 of the main body 106. Moreover, additional effusion cooling holes 150 can be provided in particular areas, such as on the inlet 102, top main body wall 108, and/or bottom main body wall 110 where the top and bottom main body walls 108, 110 meet the inlet 102, such as on the outer section 142, as best shown in FIG. 3. The effusion cooling holes 150 extend along the transition scroll 14 as necessary to provide cooling. The depicted and disclosed effusion cooling hole patterns and densities are merely exemplary in nature, and such parameters vary based on application, conditions, and desired level of cooling. For example, in some embodiments, the effusion cooling holes 150 extend along the length of the transition scroll 14, including the end portion 114. The particular placement of effusion cooling holes 150 can be assisted by computational fluid dynamics (CFD) analysis.

The effusion cooling holes 150 are generally 0.01 to 0.04 inches in diameter, although the diameter may vary with application and may depend on factors such as the dimensions of the transition scroll 14, the temperature of the combustion gases, and the velocity of the cooling flow. Individual hole shape is generally cylindrical or oval, with minor deviations due to manufacturing method i.e. edge rounding, tapers, out-of-round or oblong, etc. Other embodiments could use holes with shapes other than circular or oval. The effusion cooling holes 150 are typically provided at acute angles, such as 20°, to the surface of the transition scroll 14. The effusion cooling holes 150 can be oriented along a flow direction, transverse to the flow direction, in between, or a combination of the three. In one embodiment, the angles of the effusion cooling holes 150 are varied adjacent to the manufacturing seams (e.g., seam 144 of FIG. 2 between the top main body wall 108 and the inner main body wall 112) such that individual effusion cooling holes 150 do not traverse the seams, thereby enabling effusion hole drilling prior to transition scroll final assembly.

The transition scroll 14 may be constructed of any material suitable for high temperature combustible systems. Typically, the transition scroll 14 has a single wall construction, although other configurations such as double wall constructions are also possible. Thin sheet metal capable of withstanding high temperatures may be used to fabricate the transition scroll 14 through a forming process and machined rings (not shown) may be welded to the sheet metal to form specified interface characteristics and for structural reinforcement. Examples of suitable materials are nickel-based alloys, such as Inconel, Haynes 230 or Hastelloy X.

The effusion cooling holes 150 may be formed by drilling techniques such as electrical-discharge machining (EDM), stationary percussion laser machining and percussion on-the-fly laser drilling or with complex casting techniques.

Although the transition scroll 14 is configured for a single can combustor 12, as illustrated herein, aspects of the present invention are also applicable to other types of combustors, such as multi-can and can-annular arrangements. Engine assemblies of the present invention can be utilized in gas turbine applications such as aircraft propulsion, land-based vehicle propulsion, marine based propulsion, auxiliary power units and power generation.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An engine assembly, comprising:
   a combustor comprising a combustion chamber in which an air and fuel mixture is combusted to produce combustion gases;
   a transition scroll coupled to the combustor for receiving the combustion gases, the transition scroll comprising an interior surface, an exterior surface, and effusion cooling holes for providing cooling air to the interior surface, wherein the transition scroll is helical with an inlet and a B-width outlet; and
   a turbine coupled to the transition scroll for receiving and extracting energy from the combustion gases.

2. The engine assembly of claim 1, wherein at least a portion of the effusion cooling holes are adjacent to the inlet.

3. The engine assembly of claim 1, wherein the transition scroll has an inner portion and an outer portion, the effusion cooling holes comprising a first group with a first density on the outer portion and a second group with a second density on the inner portion, the first density being greater than the second density.

4. The engine assembly of claim 1, wherein the transition scroll has a non-circular cross-section.

5. The engine assembly of claim 1, wherein the transition scroll comprises an inlet and a main body coupled to the inlet, the effusion cooling holes being formed on the inlet.

6. The engine assembly of claim 5, wherein the effusion cooling holes are additionally formed on the main body.

7. The engine assembly of claim 6, wherein the effusion cooling holes on the inlet have a greater density than the effusion cooling holes on the main body.

8. The engine assembly of claim 6, wherein the main body has a helical configuration with an inner section and an outer section, the effusion cooling holes on the main body comprising a first group with a first density on the outer section and a second group with a second density on the inner section, the first density being greater than the second density.

9. The engine assembly of claim 6, wherein main body comprises a first wall coupled to a second wall.

10. The engine assembly of claim 9, wherein the first wall and second wall each have a first portion and a seam portion at which the first and second walls are coupled together, and the effusion cooling holes being oriented at a first angle in the first portions and at a second angle in the seam portions, the second angle being larger than the first angle.

11. The engine assembly of claim 1, wherein the effusion cooling holes comprise a first group with a first density and a second group with a second density.

12. The engine assembly of claim 1, wherein the effusion cooling holes are unevenly spaced.

13. A transition scroll for receiving combustion gases from a combustor and providing the combustion gases to a turbine, the transition scroll comprising:
   a body configured to extend between the combustor and the turbine scroll, the body having a hot surface and a cold surface during operation; and
   effusion cooling holes formed in the body for supplying cooling air to the hot surface, wherein the effusion cooling holes comprise a first group with a first density and a second group with a second density, and wherein the body is helical with an inlet and an outlet, at least a portion of the effusion cooling holes being adjacent the inlet.

14. The transition scroll of claim 13, wherein the outlet is a B-width outlet.

15. The transition scroll of claim 14, wherein the body has an inner portion and an outer portion, the first group of effusion cooling holes being positioned on the outer portion and the second group of effusion cooling holes being positioned on the inner portion, the first density being greater than the second density.

16. The transition scroll of claim 13, wherein the body has a non-circular cross-section.

17. The transition scroll of claim 13, wherein the effusion cooling holes are unevenly spaced.

18. An engine assembly, comprising:
a can combustor comprising a combustion chamber in which an air and fuel mixture is combusted to produce combustion gases;
a turbine for receiving and extracting energy from the combustion gases; and
a transition scroll coupling the can combustor to the turbine, the transition scroll being helical with an inlet coupled to the can combustor and a B-width outlet coupled to the turbine, the transition scroll having a hot surface, a cold surface, and effusion cooling holes for providing a layer of cooling air to the hot side, the transition scroll further having an inner portion and an outer portion, the effusion cooling holes comprising a first group with a first density on the outer portion and a second group with a second density on the inner portion, the first density being greater than the second density.

* * * * *